United States Patent [19]
Carlson

[11] 3,858,050
[45] Dec. 31, 1974

[54] ELECTRICALLY INSULATING GAMMA RADIATION SHIELD

[75] Inventor: Roland Wester Carlson, Lyndhurst, Ohio

[73] Assignee: The Kewanee Oil Company, Bryn Mawr, Pa.

[22] Filed: Sept. 29, 1972

[21] Appl. No.: 293,448

[52] U.S. Cl............ 250/515, 250/361, 313/313
[51] Int. Cl. ............................................ G21f 3/00
[58] Field of Search .......... 250/361, 368, 369, 515, 250/519, 520; 313/312, 313

[56] References Cited
UNITED STATES PATENTS

| | | | |
|---|---|---|---|
| 2,961,415 | 11/1960 | Axelrad | 250/515 X |
| 3,143,512 | 8/1964 | Kline | 250/515 X |
| 3,300,329 | 1/1967 | Orsino et al. | 250/515 X |
| 3,531,651 | 9/1970 | Lieber et al. | 250/361 |
| 3,675,061 | 7/1972 | Harrison | 250/515 X |
| 3,736,457 | 5/1973 | Cullen et al. | 313/313 |

Primary Examiner—Archie R. Borchelt
Attorney, Agent, or Firm—Cain and Lobo

[57] ABSTRACT

In a gamma-ray camera which utilizes a main image intensifier or amplifier tube coupled to a second image amplifier tube, leakage of noise from extraneous sources occurs axially through the zone between the main image tube and a back shield which surrounds the main image tube. Axial leakage is essentially eliminated by an insulating axial shield which jackets the main image tube, the second image tube, and the coupling rings which couple the main image tube to the second image tube. In a specific embodiment, the axial shield is formed by a filled electrically non-conductive resin. Electrically non-conductive heavy metal oxides, such as lead oxide, are preferred fillers.

3 Claims, 2 Drawing Figures

ELECTRICALLY INSULATING GAMMA RADIATION SHIELD

BACKGROUND OF THE INVENTION

Gamma-ray cameras find especial application in the determination of the distribution of radioactive isotopes injected into a living body locally, for a diagnostic purpose. Applications include the investigation of the shape and dimensions of cancerous growths which may invade the organs of the living body. An image amplifier system such as is disclosed in my U.S. Pat. No. 3,026,412 is particularly suited for use with a gamma-ray camera such as is disclosed in my U.S. Pat. No. 3,048,698. With this instrument, extraneous signals referred to as "noise," such as patient "scatter" photocathode dark current, and cosmic radiation background, are minimized; the resolution and intensity obtained is sufficient to accurately scan tumors, lesions, etc. heretofore deemed impractical. The back shield for the image intensifier tube, like the side shield on which it is removably disposed, is made of lead. The back shield is a skirted hollow cone truncated near its upper or rear end toward which the thickness of the cone is narrowingly tapered. The rear portion of the main image intensifier tube is disposed longitudinally coaxially within the back shield and, because the surface of the main image tube near the rear is about 20,000 volts, the upper end of the skirted conical back shield is necessarily spaced apart from the surface of the image tube.

A presently used gamma-ray camera utilizes scintillation crystals disposed in a scintillation crystal mosaic, the ends of the crystals being placed in contact with the surfaces of the input window of the main image intensifier tube. Good resolution obtained as a result of physical contact of the scintillation crystals with the input window.

Occasionally, it was found that, during use of a gamma-ray camera of the type described hereinbefore, the image was obliterated due to leakage of noise. It was determined that possible sources of leakage of noise into the camera were (a) axial leakage through a zone between the surface of the image tubes and the inner wall of the back shield and (b) peripheral leakage around the rim of the input window of the main intensifier tube.

Shielding the zone so as to stop gamma-ray leakage, at the same time preventing a high-voltage electrical short circuit between the shield and the image tube, presented a difficult problem. Materials which are electrically non-conductive such as the ceramics, are generally gamma-ray permeable, while dense gamma-impermeable materials such as the heavy metals are good electrical conductors. The problem of noise in an instrument of high sensitivity is magnified. For example, a patient in an adjacent room might be a noise source which would obliterate the image of the patient being scanned many feet away simply because of a noise leak axially through the zone between the image tube and the back shield.

SUMMARY OF THE INVENTION

Increased sensitivity of a gamma-ray camera is especially useful since the problem of noise has been essentially eliminated. In particular, obliteration of an image due to noise leakage axially through the zone between the surface of the image tube and the back shield is prevented. In one embodiment, axial leakage is attenuated by an insulating axial shield comprising a curable silicone rubber filled with an electrically non-conductive heavy metal oxide such as lead oxide.

In another embodiment, axial leakage of noise is attenuated by a shaped axial shield disposed upon the back shield, which surrounds the main image tube, so as to loosely jacket the main image tube and the coupling rings which couple the main image tube to the second image tube. The shaped axial shield is preferably cast from an electrically non-conductive thermosetting resin filled with an electrically non-conductive heavy metal oxide.

DETAILED DESCRIPTION OF THE PREFERRED EMBODIMENT

The gamma-ray camera referred to hereinabove is stable in operation, linear, and drift-free. As a scintillation detector, the camera has high energy resolution to minimize patient scatter and background radiation; as an imaging device, it clearly reproduces the image at high intensity. The improvement of the instant invention is directed to making a highly sensitive gamma-ray camera, having a rotatable camera head, substantially more insensitive to axial leakage of noise.

Figure 1:
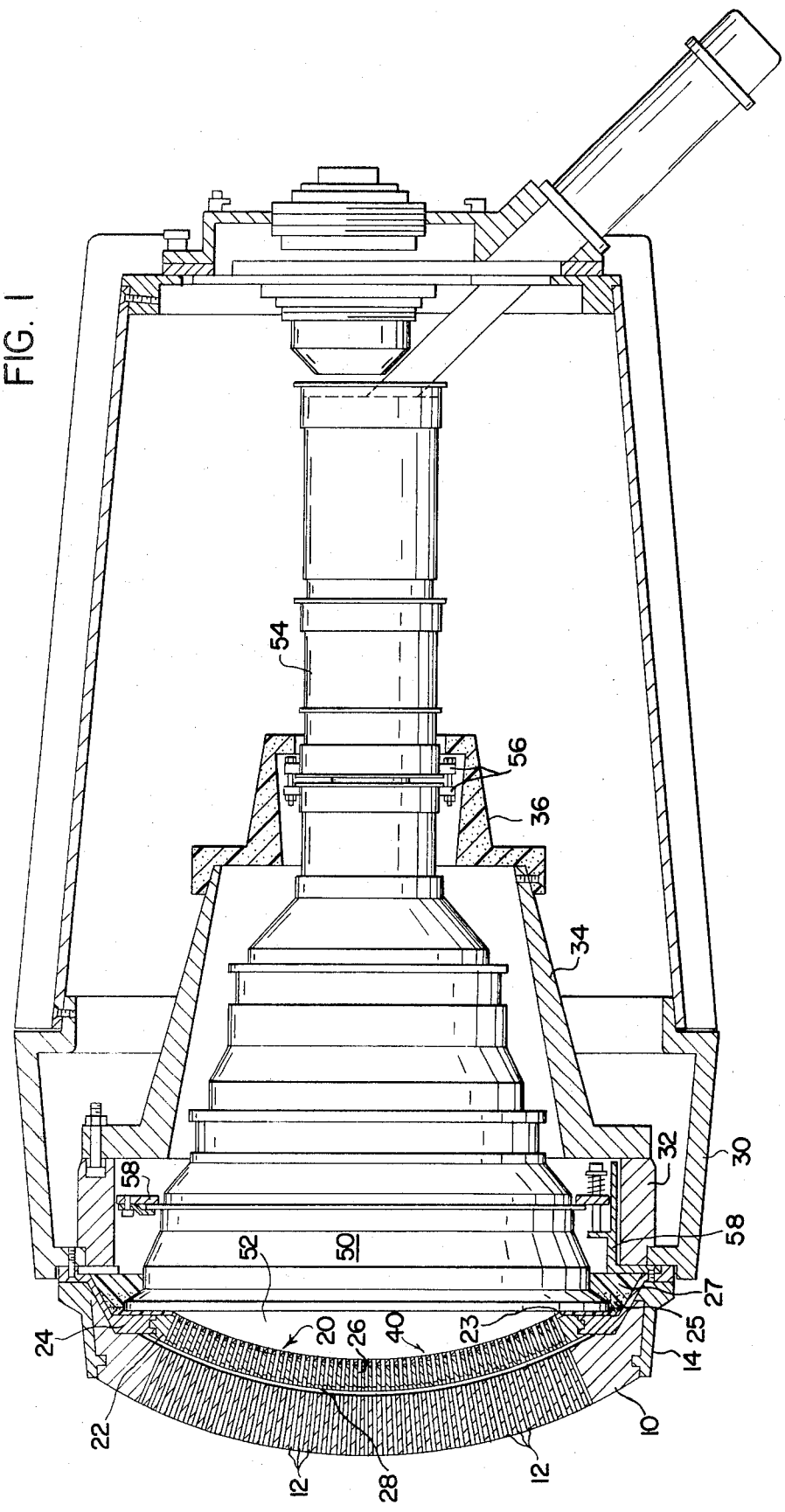
FIG. 1 is a diagrammatic illustration of a side-elevation section of a gamma-ray camera wherein the shaped axial shield loosely jackets the main image tube and the coupling rings which couple the main image tube to the second image tube.

Referring now to FIG. 1, which diagrammatically illustrates a side-elevation section of the rotatable camera head of the gamma-ray camera improved by this invention, a lead collimator 10 having channels 12 therein is fixedly disposed in a collimator mounting ring 14. The collimator 10 is a section of an essentially spherical lead shell of suitable thickness, in the range from about 1 to about 3 inches, depending upon the energy level of the gamma-source to be scanned. There are approximately 2,515 radially divergent channels in side-by-side relationship on hexagonal centers, the diameter of the channels being approximately one eighth inch. A larger or smaller number of channels may be used depending on the field of view and other factors. The collimator mounting ring 14 is disposed on a scintillation cyrstal mosaic, shown generally at 20, the inner surface of the collimator 10 being in spaced-apart relationship from the exterior surface of a mosaic lead matrix or shell 22 fixedly disposed in a mosaic mounting ring 24. This spaced-apart relationship may be maintained by a gamma-ray-permeable sheath 28 (not shown) which snugly covers the exterior surface of the mosaic shell 22. The mosaic shell 22 is a section of an essentially spherical shell provided with 2,515 mosaic channels 26, in one-to-one correspondence with the collimator channels 12 and precisely aligned therewith. The collimator mounting ring 14 and the mosaic mounting ring 24 are together fixedly disposed on a head casting 30 so that the collimator 10 and the mosaic lead shell 22 are concentrically disposed. The mosaic channels 26 are slightly larger than 0.125 inch in diameter and are through-passages between the outer surface and inner surface of the mosaic shell 22.

A scintillation crystal, shown generally at 40, is disposed in each mosaic channel 26 and 2,515 scintillation crystals are used. Each of the 2,515 scintillation crystals disposed in each of the mosaic channels 26 is aligned with a corresponding collimator channel 12. The scintillation crystals may be formed from any suitable phosphor such as thallium doped cesium iodide. Each crystal is about 0.125 inch in diameter and of sufficient length so as to protrude slightly, inwardly, from the inner surface of the mosaic shell 22.

A main image intensifier tube, shown generally at 50, abuttingly rests against the protruding ends of each of the scintillation crystals 40 so that the cylindrical end of each crystal is in contact with the input window 52 of the photocathode of the main image intensifier tube. A side shield 32 surrounds the lower portion of the main image tube and is fixedly disposed in the head casting 30. A back shield 34 surrounds the upper portion of the main image tube and is removably disposed upon the side shield 32. The back shield 34 is shaped as a skirted hollow cone truncated towards the rear. The back shield 34 surrounds the upper or rear portion of the main image tube 50, and, if desired, may be tapered, the wall thickness decreasing towards the rear. The zone between the inner surface of the back shield 34 and the outer surface of the rear portion of the main image tube is shielded by means to be described hereinafter.

The output of the main image tube 50 is on a fiber optic plate and this output of the main image tube is conducted to the fiber optic plate input of a second image tube 54 axially aligned witn and coupled to the main image tube 50. Coupling is effected by a pair of coupling rings 56 which are held together by locking means circumferentially disposed upon the coupling rings. A silicone coupling grease having a refractive index of about 1.4 is smeared between the fiber optic output of the main image tube and the fiber optic input of the second image tube so as to provide a film which evenly contacts both fiber optic surfaces when the main and second image tubes are coupled.

A high speed lens system is in light-communication with a photographic phosphor screen and a camera back which records the images. A light pipe is in light-communication with a signal phosphor screen and a photo multiplier tube. The foregoing features are conventional in a gamma-ray camera of the type referred to herein and are not identified in FIG. 1.

It has been found from experience that the zone immediately surrounding the rim of the photocathode tube is susceptible to peripheral leakage of noise radially directed into this zone. Peripheral leakage of noise is attenuated by pouring a particulate mass of gamma-ray impermeable heavy metal such as lead shot 25 around the periphery of the input window. A thermosetting synthetic resinous mass 27 is flowed upon the surface of the particulate mass and is permitted to cure in place so as to fixedly dispose the main image tube with respect to the scintillation crystal mosaic and the back shield 34. This disposition of the main image tube is maintained by mounting the main image tube on a clamping ring 58 circumferentially disposed upon the inner surface of the side shield 32. The back shield 34 is removably mounted upon the side shield 32 as by means of plural bolts disposed within the side shield.

In one embodiment of this invention, the rear portion of the back shield supports an insulating axial shield 36 which loosely jackets the rear portion of the main image tube 50 and the forward portion of the second image tube 54. The axial shield 36 is a hollow skirted cone formed from an electrically non-conductive curable resin filled with an electrically non-conductive heavy metal oxide. The precise shape and dimensions of the axial shield are not critical as long as the shield has sufficient thickness to block out unwanted radiation. The dimensions of the shield are chosen so that it may be slipped over the coupled image tubes and fixedly disposed on the back shield 34. The axial shield is preferably cast from a filled thermosetting synthetic resin by any known means, and cured to produce the desired shape. Alternatively, the shield may be machined from a cast block of filled resin or from a 'rough' casting. The particular requirements of the machining operations may influence the choice of resin. A typical axial shield is preferably cast from a relatively electrically non-conductive casting resin such as an epoxy resin, or a polyester such as methyl methacrylate which cures to a rigid mass. The casting resin is filled with a filler of an electrically non-conductive, gamma-ray-impermeable heavy metal oxide preferably lead oxide. Such a resin may be compounded by dispersing in the resin lead oxide in finely divided powder form, the particles having a diameter up to about 100 microns. The particles are stirred into the curable resin and stirring is continued until the resin thickens to a point where the viscosity prevents a settling-out of the homogeneously dispersed particles while it is being cured. Sufficient filler is used to provide the desired shielding but no so much as to interfere with the proper curing of the resin.

Figure 2:
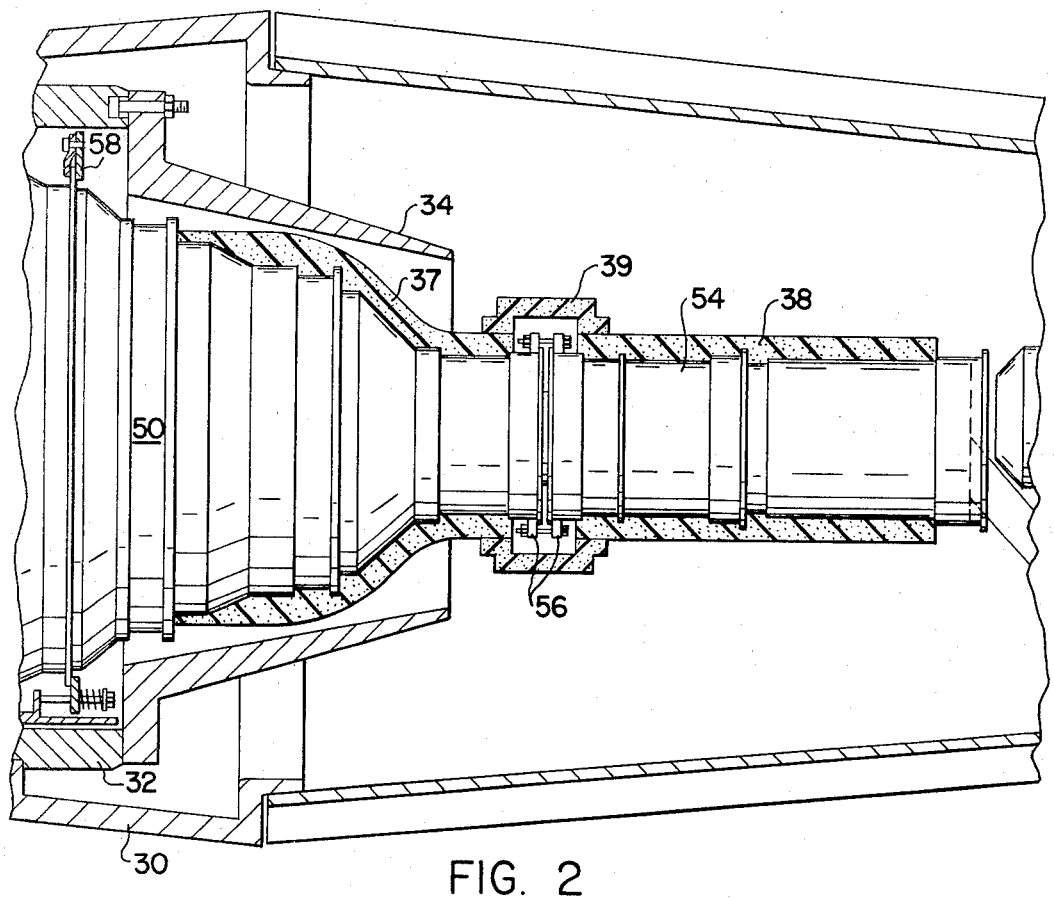
FIG. 2 is a diagrammatic illustration of a side-elevation section of a gamma-ray camera with the front and back portions broken away, wherein the main image tube, the second image tube and the coupling rings are jacketed with an insulating axial shield of a lead oxide filled curable silicone rubber.

In another, more preferred embodiment illustrated in FIG. 2 where numerals have the same connotation as in FIG. 1, a curable electrically non-conductive synthetic resinous material, filled with an effective quantity of a gamma-ray-impermeable heavy metal oxide such as finely divided lead oxide, is cast circumferentially directly on to the outer surfaces of the main image tube 50 and the second image tube 54. Preferred resins are those recognized in the art as 'potting resins' which are curable at relatively low temperatures. Either resins which adhere tightly to the tube surfaces, or those resins which are strippable, may be used. Strippable resins are preferred since they permit easy access to electrical terminals for maintenance.

Preferred strippable potting resins are the silicone rubbers typified by the RTV and 600 series manufactured by General Electric Co. In a typical potting application, one part GE 602 clear silicone rubber is mixed with five parts by weight of finely divided litharge to form a homogeneous mixture. The mixture is poured between the main image tube and a mold disposed about the tube in such a manner as to form an insulating axial shield 37 snugly jacketing the main image tube 50. In a similar manner, another insulating axial shield 38 is formed so as to snugly jacket the second image tube 54. Additionally, again utilizing a suitable mold, a boot 39 is formed which snugly fits around and bridges the axial shields 37 and 38 at the same time shrouding the coupling rings 56. In addition to providing shielding against noise leakage, the axial shields and boot formed by potting a lead oxide filled silicone rubber, reduce corona discharge of the tubes and secure electrode connecting leads so as to minimize breakage or loose connections. Electrode connecting leads which emanate from the image tubes are not shown in the FIG. 2.

Though silicone rubbers are preferred, as indicated hereinabove, any fillable curable elastomer may be used which has high resistivity and good dielectric strength; which can be heavily filled with lead oxide, but yet be curable at a temperature below 50°C. to ensure against damage to the image tubes; and which can be conveniently stripped from the tube surface after it is cured.

In another embodiment, an electrically insulating gamma-ray shield may be formed by utilizing a receptacle having upper, lower and side walls so as to define a cavity which may be sealed after it is filled. The walls of the receptacle may be formed from a thermoplastic or thermosetting resinous material. Thermoplastic resins such as polyolefins may be reotationally molded to provide a cavity in a receptacle shaped as desired to closely embrace a source of high voltage. A thermosetting resin may be cast about a core formed as described hereinafter.

The core of the shield is composed of a non-radioactive heavy metal, having an atomic number greater than 73, or a compound of the heavy metal. The core may be formed either from plural stackable rings or machined as a single piece. Alternatively, a heavy metal compound such as an oxide or carbide, preferably tungsten carbide, mercuric oxide, or lead oxide may be used, as in finely divided particulate form, and bonded under pressure to form a core of any desired shape. Irrespective of the manner in which the core is formed, it may be encapsulated in the electrically non-conductive resin.

Where the receptacle is molded to provide a cavity, a liquid heavy metal such as mercury may be conveniently used to fill the cavity which is thereafter sealed. If a highly conductive metal, like mercury, is used the thickness of the walls of the receptacle is chosen so as to provide the necessary electrical insulation when proximately disposed to the high voltage source. Where a core is molded by compression, for example, using a combination of lead oxides bonded with linseed oil, glycerin and the like, a flowable resin may be cast around the core. Preferred resins are the insulating casting resins particularly polyesters and epoxides.

It will be apparent from the foregoing that electrically insulating gamma-ray-impermeable shields, such as described hereinabove, may be molded directly around image tubes to provide a gamma-ray-impermeable jacket, or formed as a shaped article to provide an effective, simple and easy to use axial shield which may be tailored for application in any gamma-ray camera.

In the particular use of an axial shield in a gamma-ray camera, such as is described in FIG. 1, the inner surface of the axial shield is in spaced-apart relationship from the periphery of the coupling rings 56, the spacing being so chosen as to prevent an electrical short circuit. It will be apparent that the choice of the casting resin and the filler therefor, along with the spacing of the axial shield from the coupling rings, must be made with due care since, in operation, the surface of the image tubes is at approximately 20,000 volts potential. One or another embodiment of the shield described herein may be used in any application where both radiation protection and electrical insulation are simultaneously required. The particular embodiment chosen will depend upon the size and shape of the device to be shielded, and the economics of providing adequate protection, both with respect to the amount of filler used and the wall thickness of the shield, against a known level of radiation energy.

What is claimed is:

1. In a gamma-ray camera having an image amplification means operating at an electrical potential in the range from about 10,000 to about 100,000 volts, the improvement consisting of a self-supporting insulating axial shield, of sufficient thickness to shield against gamma-rays of predetermined energy, disposed around the circumferentially closely embracing said amplification means in electrically non-conductive spaced-apart relationship therewith, said axial shield comprising a non-radioactive, heavy metal having an atomic number greater than 73, or a compound thereof, disposed within an electrically non-conductive resin so as to prevent arcing between said heavy metal or compound thereof and said image amplification means.

2. The article of claim 1 wherein said electrically non-conductive resin circumferentially envelops said image amplification means and is curable in contact therewith at a temperature below that which is injurious to said image amplification means, and said heavy metal oxide is lead oxide.

3. The article of claim 2 wherein said electrically non-conductive resin circumferentially envelops said image amplification means and is curable in contact therewith at a temperature below that which is injurious to said image amplification means, and said heavy metal oxide is lead oxide.

* * * * *